United States Patent [19]

Deckman et al.

[11] 4,188,532

[45] Feb. 12, 1980

[54] METHOD FOR THE NON-DESTRUCTIVE ASSAYING OF LASER FUSION TARGETS

[75] Inventors: Harry W. Deckman, Fanwood; Gerald M. Halpern, Sommerville, both of N.J.

[73] Assignee: The University of Rochester, Rochester, N.Y.

[21] Appl. No.: 873,567

[22] Filed: Jan. 30, 1978

[51] Int. Cl.$^2$ .............................................. G01J 1/00
[52] U.S. Cl. .................................. 250/336; 250/308; 176/1
[58] Field of Search ............... 250/303, 501, 502, 308, 250/336; 313/615; 176/1

[56] References Cited

U.S. PATENT DOCUMENTS 3,940,617  2/1976  Farnum et al. ...................... 250/303

OTHER PUBLICATIONS

P. C. Souers et al., "Manufacture of DT-Filled, Hollow Glass Microsphere, Laser Targets," Rev. Sci. Instrum., vol. 46, No. 6, Jun. 1975, pp. 682-685.
Nuclear Science Abstracts, vol. 31, No. 6, Mar. 31, 1975, p. 1397.
P. C. Souers et al., Fabrication of the Glass Microballoon Laser Target, Lawrence Livermore Laboratory, UCRL-51609, TID-4500, UC-20, pp. 34-37, 07/12/74.

*Primary Examiner*—Davis L. Willis
*Assistant Examiner*—Carolyn E. Fields
*Attorney, Agent, or Firm*—Martin LuKacher

[57] ABSTRACT

In order to assay the tritium fuel content in laser fusion targets and/or to measure the pressurization of laser fusion targets of the type which use deuterium and tritium (DT) gas mixtures, without destroying the targets, the flux of beta particles which emerges from the target is measured with the aid of a gas flow proportional counter. The count rates are related to the tritium content and the pressurization. The tritium content in terms of the mass of the tritium in the target can be derived from the counting rate.

3 Claims, 2 Drawing Figures

METHOD FOR THE NON-DESTRUCTIVE ASSAYING OF LASER FUSION TARGETS

The present invention relates to the testing and measuring and particularly to non-destructive assaying of laser fusion targets.

The invention is especially suitable for assaying the tritium fuel content of laser fusion targets which contain tritium alone or in addition to other fuel materials such as deuterium and carriers for the fuel material such as glass shells and polymers. The method provided by the invention is useful with a wide variety of target configurations, including both solid and gaseous deuterium-tritium mixtures and various polymers and plastics in which tritium and deuterium are part of the molecules which make up the target, or which have been absorbed therein.

The invention is applicable for the measurement of the tritium fuel content of so-called microballoon targets which have, usually, equi-molar gaseous mixtures of deuterium and tritium encapsulated within glass ($SiO_2$) microballoons by a high temperature permeation process. Such microballoon laser fusion targets are of known construction and reference may be had to U.S. Pat. No. 3,997,435, issued Dec. 14, 1976, for further information respecting the design and construction thereof.

It is particularly important to assay the tritium content of microballoon targets before they are used in laser fusion apparatus. The deuterium and tritium gas contained in the microballoons is at pressures above atmospheric pressure and may leak through the glass microballoon walls. Consistency of results (e.g., the formulation of plasmas in laser fusion apparatus through the use of the targets) requires a knowledge of and preferably consistency of the amount of tritium and deuterium contained in these targets.

Measurements to assay the tritium content of the targets have heretofore been performed by crushing individual targets and analyzing the contents of the targets in a mass spectrometer gas analyzer system. A microballoon may also be crushed while submerged in a glycerine bath and the size of the bubble released measured to determine total gas pressure (see W. B. Rensel, T. M. Henderson & D. E. Solomon, Rev. Sci. Instru. Vol. 46, Page 787 (1975)). Such destructive testing makes the target unavailable for use in laser fusion apparatus, and it can only be inferred, with an unknown degree of accuracy, if the fuel content (of deuterium and tritium) of similar targets may be alike. A method for measuring the tritium content has been used which relies on measurement of X-rays generated in the glass shell of the target. Such X-rays have very low energy. Even with the most sensitive X-ray measurement techniques, several minutes may be required to measure the fuel content of a single target. X-rays are not emitted in measurable quantity from plastic or polymer targets and the X-ray measurement technique is not useful with these targets. For further information respecting the X-ray measurement technique reference may be had to U.S. Pat. No. 3,940,617 and to Nuclear Instrumentation and Methods, Vol. 126, Page 285 (1975).

It has been found in accordance with the invention that the active material of laser fusion targets may be assayed by measuring the flux of beta particles emitted from the target. The beta particles may be counted by locating the target inside the ionization chamber of a windowless gas flow proportional counter. The counting rate is a measurement of the tritium content. In the case of microballoon targets, it has been found that deuterium and tritium leak at essentially the same rate. Accordingly, the measurement of the tritium content by beta particle counting in accordance with the invention provides a measurement of the pressurization (viz, the pressure retention characteristics) of the microballoon targets for the total gas mixture. The measurement is efficient and may be rapidly made in a matter of seconds. The method is of course non-destructive. The rate at which beta particles are counted is directly related to the mass of tritium contained within the interior of the glass shell. This relationship is easily found by a calibration procedure which determines, empirically, the transmission probability of beta particles through the glass wall, the contribution to the measured count rate due to tritium trapped in the glass wall, and the efficiency of the counter.

Accordingly, it is a principal object of the present invention to provide an improved method for the non-destructive assay of laser fusion targets which contain beta particle emitting active material such as tritium.

It is another object of the invention to measure the pressurization of microballoon laser fusion targets filled with pressurized gas containing tritium.

It is a further object of the present invention to provide an improved method for the non-destructive measurement of the active material of laser fusion targets which may be made rapidly and with great accuracy.

It is a still further object of the present invention to provide an improved method for the non-destructive measurement of the tritium content of laser fusion targets which takes into account the tritium which is trapped or possibly dissolved in the material which contains the tritium, such as the glass shell of microballoon laser fusion targets.

The foregoing and other objects, features and advantages of the invention as well as the best mode of practicing the invention presently known will become further apparent from a reading of the following description in connection with the accompanying drawing in which.

Figure 1:
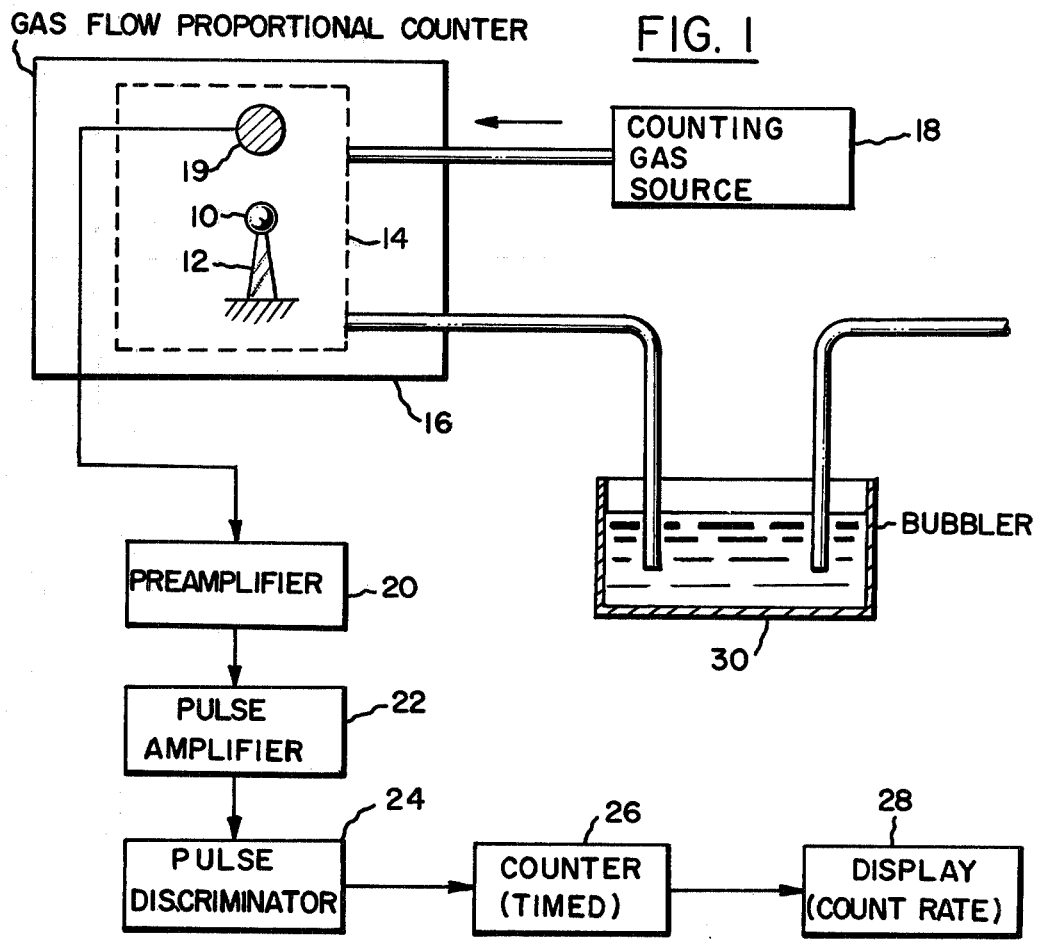
FIG. 1 is a block diagram of apparatus for practicing the invention.

Referring to FIG. 1 a laser fusion target 10, such as a glass microballoon filled with a pressurized gas mixture of deuterium and tritium, is mounted on a glass stalk 12 in the ionization chamber 14 of a gas flow proportional counter 16. A suitable gas flow proportional counter is sold by LND Inc., of Oceanside, N.Y., their Model 4901. Counting gas such as P10 gas from a source 18 enters the chamber 14 and is ionized by the beta particles which emerge from the target 10. The counting gas flows through the ionization chamber and out through a bubbler 30 which prevents air from leaking back into the ionization chamber. The ions are collected on an electrode 19. As the ions are collected, pulses are generated which correspond to the number of beta particles emitted by the target 10. These pulses are amplified in a preamplifier 20. A pulse amplifier 22 further amplifies these pulses. Noise is rejected as by a thresholding technique, in a pulse discriminator 24. The pulses from the discriminator are applied to a counter 26 which may have a pretimed counting cycle, say of one second in duration. The count which is displayed on a display 28, such as an LED readout from the counter 26, is a measure of the count rate, i.e., the rate at which the beta particles are counted.

Figure 2:
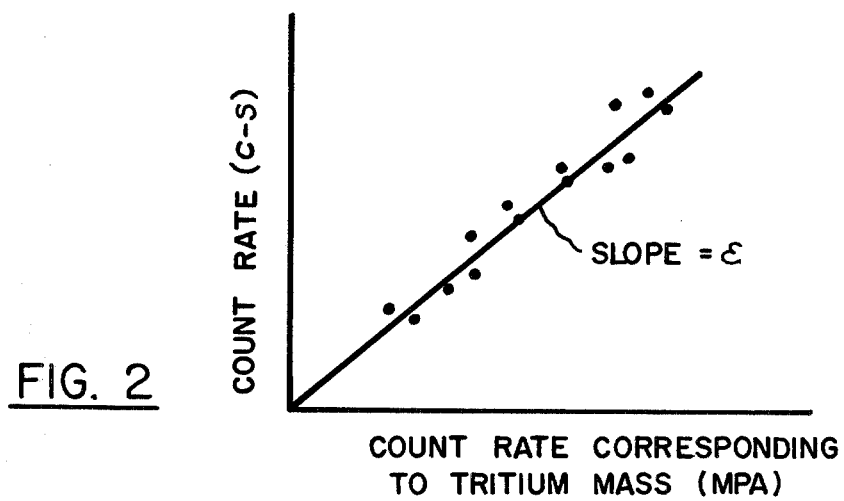
FIG. 2 is a curve useful in the calibration of the apparatus shown in FIG. 1.

In the case of microballoon targets the observed beta particle counting rates are due to tritium gas in the hollow interior of the microballoon as well as tritium which is trapped or possibly dissolved in the glass shell. The mass of tritium in the interior of the microballoon, M, is given by $$M = (C - S)/P\epsilon A \quad (1)$$

where C is the measured beta particle counting rate, S is the contribution to the measured counting rate from the tritium trapped in the shell, P is the average probability that a beta particle emitted in the interior of the balloon penetrates the glass wall, $\epsilon$ is the counter efficiency and A equals $3.57 \times 10^{14}$ decays per (sec-g) which is the specific activity of tritium. Accordingly, by substracting the contribution to the measured count rate from the tritium trapped in the shell (subtracting S from C) and dividing the difference by the product of P, $\epsilon$ and A the mass M is obtained. Since S is fixed for the target configuration as will be explained below and since P $\epsilon$ A is also fixed for the target configuration, the display 28 may be calibrated in terms of the mass of tritium in the target 10. $\epsilon$ is a function of the counter apparatus and may be derived by plotting the count rate C−S against a count rate corresponding to the actual mass of the tritium, which is the quantity MPA. This actual mass in terms of count rate (MPA) may be obtained by measuring independently the tritium content of several microballoon targets which have been counted and which have known wall thickness and diameters. These measurements may be performed by crushing individual microballoon targets in a calibrated quadruple mass spectrometer gas analyzer system. The resulting curve as shown in FIG. 2 then has a slope which equals $\epsilon$. This slope may be used to calibrate the display so as to read out the mass of the tritium contained in the target directly.

Consider the other parameters of equation (1). The escape probability P can be calculated from studies of the transmission of kilovolt electrons through thin films by convoluting the SiO$_2$ (transmission probability) with the measured beta spectrum. The average transmission probability is derived from the work described in Cosiett and Thomas, British Journal of Applied Physics, Volume 15, page 883 (1965). The probability of a beta particle being transmitted through the glass wall of the microballoon is accurately represented by $$P = 0.91 e^{-2.75 t} \quad (2)$$

for thicknesses, t, from 0.3 to 1.0 micrometers. The contribution, S, to the total count rate is from the tritium trapped in the glass walls. In order to assess this contribution quantitatively the following equation has been developed based on a model where the tritium is uniformly distributed throughout the glass walls of the target with a density $\rho_T$. Accordingly, $$S = \pi d^2 t \rho_T A P' \epsilon \quad (3)$$

where d is the balloon diameter and P′ is the average escape probability for beta particles originating in the glass walls. For microballoon sizes of the order of 150 micrometers and less, P′ is essentially a function of thickness t only and an excellent fit to the function is $$P' = 0.58 e^{-1.15 t} \quad (4)$$

In order to verify that the contribution S as may be derived from equation (3) is correct, S was measured by the use of the gas flow proportional counter system shown in FIG. 1 by counting a large number of microballoon targets which were impaled with a five-micrometer diameter glass stalk to let the gas trapped inside escape. A plot of the measured count rate versus $\pi d^2 t P'$ was found to be a straight line whose slope is $\rho_T A E$. The tritium density in the glass wall calculated from the least squares fit to the data (using equation (1)) is $$\rho_T = (9.5 \pm 1.5) \times 10^{-4} \text{g/cm}^3 \quad (5)$$

for data obtained from a batch of microballoon targets originally filled with 8.9 atmospheres of an equimolar deuterium tritium gas mixture. The density of tritium in the original fill gas of each of these microballoons in the batch was $1.16 \times 10^{-3}$g/cm$^3$. This data indicates that tritium is distributed throughout the glass wall with the same density present in the microballoons when they are initially filled. In order to further clarify the distribution of tritium in the glass wall, a deuterium tritium gas mixture filled microballoon was disected and approximately one hemisphere thereof was mounted on a glass mounting stalk. This fragment was then analyzed in the gas flow proportional counter shown in FIG. 1 with the inside hemispherical surface first facing upward and then rotated 180° face downward. There was no difference in counting rates between these two analyses. Since the proportional counter is essentially a $2\pi$ device, this experiment evidences that the tritium is distributed within the glass wall with a symmetric concentration profile.

It has been found that the deuterium and tritium in the gas mixture leak from the microballoons at the same rate. Accordingly, the mass of the deuterium in the microballoons is directly related to the mass of the tritium. The total pressure inside the deuterium filled glass microballoons is therefore directly related to the counting rate which is displayed on the counter 28 and may be obtained from the counting rate measurement.

From the foregoing description it will be apparent that there has been provided an improved method for assaying the fuel content (viz., the content of an active material, such as tritium which emits beta particles) in laser fusion targets. While exemplary methods and the theory of operation of the method has been described, variations and modifications within the scope of the invention will undoubtedly suggest themselves to those skilled in the art. Accordingly, the foregoing description should be taken merely as illustrative and not in any limiting sense.

What is claimed is:

1. The method of measuring the content of active fuel material in a laser fusion target which comprises the steps of measuring the flux of beta particles emitted by said target by counting the rate at which said beta particles are emitted, said content being the mass of said active material of said target, and dividing said count rate by the product of the escape probability of said particles from said target (P), the efficiency of counting ($\epsilon$), and the specific activity of said active material (A), said target being a hollow shell containing a gas including tritium gas under pressure greater than atmospheric pressure therein as said active material, and subtracting the contribution to the measured count rate from tritium trapped in said shell, S, prior to said dividing step to obtain the mass of said tritium.

2. The invention as set forth in claim 1 wherein said target is a microballoon having a thin shell of $SiO_2$ of thickness t from 0.3 to 1.0 micrometers, and said active material containing tritium and deuterium gas under pressure, said escape probability P being equal to $0.91e^{-2.75t}$, and said contribution to said measured count rate from tritium trapped in said shell S being equal to $\pi d^2 t\, \rho_T A P' \epsilon$ where d is the diameter of said shell, $\rho_T$ is the density of tritium in said shell and is equal to $(9.5 \pm 1.5) \times 10^{-4} g/cm^3$, and P' is the average escape probability of beta particles originating in the shell and is equal to $0.58e^{-1.15t}$.

3. The invention as set forth in claim 2 including the step of deriving from said count rate measurement the total pressure inside the deuterium tritium filled shell.

* * * * *